US012087206B2

(12) United States Patent
Liou et al.

(10) Patent No.: US 12,087,206 B2
(45) Date of Patent: Sep. 10, 2024

(54) COLOR ADJUSTMENT DEVICE, DISPLAY AND COLOR ADJUSTMENT METHOD

(71) Applicant: WISTRON CORP., New Taipei (TW)

(72) Inventors: Chang Lin Liou, New Taipei (TW); Chih Hao Lo, New Taipei (TW); Cheng Ta Wu, New Taipei (TW)

(73) Assignee: WISTRON CORP., New Taipei (TW)

( * ) Notice: Subject to any disclaimer, the term of this patent is extended or adjusted under 35 U.S.C. 154(b) by 121 days.

(21) Appl. No.: 17/817,181

(22) Filed: Aug. 3, 2022

(65) Prior Publication Data

US 2023/0335039 A1 Oct. 19, 2023

(30) Foreign Application Priority Data

Apr. 13, 2022 (TW) ................................ 111114068

(51) Int. Cl.
*G09G 3/34* (2006.01)
*G09G 3/20* (2006.01)
(Continued)

(52) U.S. Cl.
CPC ......... *G09G 3/2096* (2013.01); *G09G 3/3406* (2013.01); *G09G 3/2003* (2013.01); *G09G 3/2007* (2013.01); *G09G 3/2011* (2013.01); *G09G 3/2014* (2013.01); *G09G 3/32* (2013.01); *G09G 3/3225* (2013.01);
(Continued)

(58) Field of Classification Search
CPC .. G09G 3/2096; G09G 3/2007; G09G 3/2011; G09G 3/2014; G09G 3/3225; G09G 3/3258; G09G 2310/0262; G09G 2320/0626; G09G 2320/0673; G09G 2360/16; G09G 3/2003; G09G 3/32;
(Continued)

(56) References Cited

U.S. PATENT DOCUMENTS 7,511,695 B2 * 3/2009 Furukawa ............ G09G 3/3413 345/102
8,730,274 B2 * 5/2014 Chiou .................. G09G 3/3406 345/102
(Continued)

FOREIGN PATENT DOCUMENTS

CN 104751807 A 7/2015

OTHER PUBLICATIONS

TW Office Action dated Feb. 24, 2023 in Taiwan application No. 111114068.

*Primary Examiner* — Mihir K Rayan
(74) *Attorney, Agent, or Firm* — McClure, Qualey & Rodack, LLP

(57) ABSTRACT

A color adjustment device applied to a display panel includes a first controller and a second controller. The first controller is configured to control light emission of the display panel. The second controller is connected to the first controller, and is configured to receive an input image, and determine whether a blue component proportion of the input image is greater than a preset proportion and whether luminance of the display panel is lower than a luminance threshold value, wherein at least one pulse signal is transmitted from the second controller to the first controller through a first signal line when the blue component proportion is greater than the preset proportion and the luminance of the display panel is lower than the luminance threshold value.

19 Claims, 5 Drawing Sheets

(51) Int. Cl.
*G09G 3/32* (2016.01)
*G09G 3/3225* (2016.01)
*G09G 3/3258* (2016.01)

(52) U.S. Cl.
CPC ... *G09G 3/3258* (2013.01); *G09G 2310/0262* (2013.01); *G09G 2320/02* (2013.01); *G09G 2320/0242* (2013.01); *G09G 2320/0626* (2013.01); *G09G 2320/0666* (2013.01); *G09G 2320/0673* (2013.01); *G09G 2360/16* (2013.01)

(58) Field of Classification Search
CPC ... G09G 2320/0242; G09G 2320/0666; G09G 3/3406; G09G 2320/02
See application file for complete search history.

(56) References Cited

U.S. PATENT DOCUMENTS

| | | | | |
|---|---|---|---|---|
| 9,747,844 | B2 | 8/2017 | Diao et al. | |
| 2004/0257329 | A1* | 12/2004 | Park | G09G 3/3648 345/102 |
| 2005/0068587 | A1* | 3/2005 | Hayaishi | H04N 1/628 358/530 |
| 2006/0022616 | A1* | 2/2006 | Furukawa | G09G 3/342 315/309 |
| 2007/0152926 | A1* | 7/2007 | Kwon | G09G 3/3426 345/82 |
| 2011/0298834 | A1* | 12/2011 | Shin | G09G 3/3406 345/690 |
| 2012/0086701 | A1* | 4/2012 | Vaananen | H05B 45/14 345/214 |
| 2019/0132923 | A1* | 5/2019 | Rumer | H05B 45/22 |

* cited by examiner

| MCS1 | CIE 1931 | red | green | blue |
|---|---|---|---|---|
| | x | 0.6728 | 0.2755 | 0.1402 |
| | y | 0.324 | 0.6205 | 0.0604 |

| MCS2 | CIE 1976 | red | green | blue |
|---|---|---|---|---|
| | u' | 0.4856 | 0.1114 | 0.1628 |
| | v' | 0.5261 | 0.5644 | 0.1578 |

| TCS1 | CIE 1931 | red | green | blue |
|---|---|---|---|---|
| | x | 0.64 | 0.3 | 0.15 |
| | y | 0.33 | 0.6 | 0.06 |

| TCS2 | CIE 1976 | red | green | blue |
|---|---|---|---|---|
| | u' | 0.4507 | 0.125 | 0.1754 |
| | v' | 0.5229 | 0.5625 | 0.1579 |

| | | CIE 1931 red | green | blue |
|---|---|---|---|---|
| MCS1 | x | 0.6727 | 0.2756 | 0.1435 |
| | y | 0.3241 | 0.6207 | 0.0543 |

| | | CIE 1976 red | green | blue |
|---|---|---|---|---|
| MCS2 | u' | 0.4854 | 0.1114 | 0.1706 |
| | v' | 0.5262 | 0.5644 | 0.1452 |

| | | CIE 1931 red | green | blue |
|---|---|---|---|---|
| TCS1 | x | 0.64 | 0.3 | 0.15 |
| | y | 0.33 | 0.6 | 0.06 |

| | | CIE 1976 red | green | blue |
|---|---|---|---|---|
| TCS2 | u' | 0.4507 | 0.125 | 0.1754 |
| | v' | 0.5229 | 0.5625 | 0.1579 |

COLOR ADJUSTMENT DEVICE, DISPLAY AND COLOR ADJUSTMENT METHOD

CROSS-REFERENCE TO RELATED APPLICATIONS

This non-provisional application claims priority under 35 U.S.C. § 119(a) on patent No(s). 111114068 filed in Republic of China (ROC) on Apr. 13, 2022, the entire contents of which are hereby incorporated by reference.

BACKGROUND

1. Technical Field

The present disclosure relates to a technical field of image displaying, and particularly relates to a color adjustment device of a display panel.

2. Related Art

Recently, technology rapidly develops, electronic products also continue to be renewed and requirement of a display correspondingly increases. Hence, demand of image quality also increases. For the present, the light adjustment method of the light sources of the display mostly utilizes current signals to adjust light. However, when the luminance of the display is low, the light sources are likely to generate color variation, and there is a difference between an actual color and the color displayed by the display causing the image quality to lower.

SUMMARY

According to one or more embodiments of the present disclosure, a color adjustment device applied to a display panel includes a first controller and a second controller. The first controller is configured to control light emission of the display panel. The second controller is electrically connected to the first controller, and is configured to receive an input image, and determine whether a blue component proportion of the input image is greater than a preset proportion and whether luminance of the display panel is lower than a luminance threshold value, wherein at least one pulse signal is transmitted from the second controller to the first controller through a first signal line when the blue component proportion is greater than the preset proportion and the luminance of the display panel is lower than the luminance threshold value.

According to one or more embodiments of the present disclosure, a display includes a color adjustment device and a display panel, wherein the color adjustment device is connected to the display panel, and includes a first controller and a second controller. The first controller is configured to control light emission of the display panel. The second controller is electrically connected to the first controller, and is configured to receive an input image, and determine whether a blue component proportion of the input image is greater than a preset proportion and whether luminance of the display panel is lower than a luminance threshold value, wherein at least one pulse signal is transmitted from the second controller to the first controller through a first signal line when the blue component proportion is greater than the preset proportion and the luminance of the display panel is lower than the luminance threshold value.

According to one or more embodiments of the present disclosure, a color adjustment method applied to a display panel and performed by a color adjustment device comprising: determining whether a blue component proportion of an input image is greater than a preset proportion; determining whether luminance of the display panel is lower than a luminance threshold value; and controlling the display panel by at least one pulse signal according to the input image when the blue component proportion of the input image is greater than the preset proportion and the luminance of the display panel is lower than the luminance threshold.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown to simplify the drawings.

It is to be understood that although the terms "first", "second" and so on may be used herein to describe various elements, components, regions and/or parts, these elements, components, regions and/or parts should not be limited by these terms. These terms are used only for the purpose of distinguishing one element, component, region and/or part from another element, component, region and/or part.

In addition to, the terms "comprise" and/or "include" are referred to the existence of features, regions, structures, steps, operation and/or components, but are not to exclude the existence or adding of one or more of other features, regions, structures, steps, operation, components and/or combination thereof.

Figure 1:
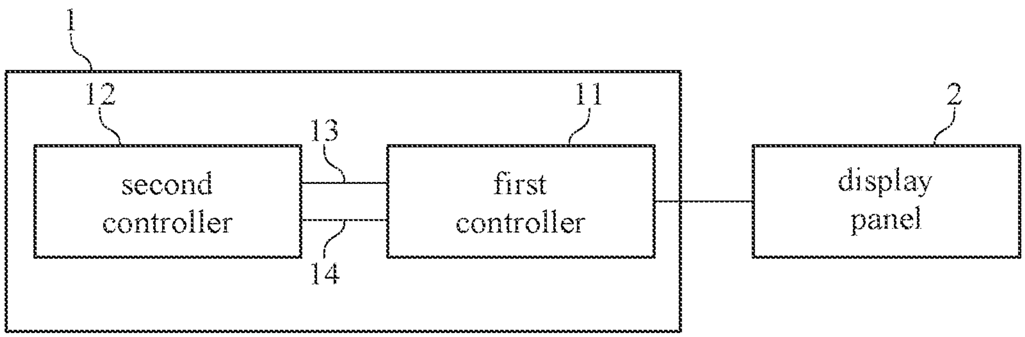
FIG. 1 illustrates a functional block diagram of a color adjustment device according to one embodiment of the present disclosure.

Please refer to FIG. 1, which illustrates a functional block diagram of a color adjustment device according to one embodiment of the present disclosure. As illustrated in FIG. 1, the color adjustment device 1 includes a first controller 11 and a second controller 12. The first controller 11 is configured to control light emission of the display panel 2. The second controller 12 is electrically connected to the first controller 11 and is configured to receive an input image (e.g. a display image). The second controller 12 determines whether a blue component proportion of the input image is greater than a preset proportion and whether luminance of the display panel 2 is lower than a luminance threshold value to control the first controller 11 to selectively output at least one pulse signal or at least one direct current signal to control the display panel 2.

Specifically, when the second controller 12 determines that the blue component proportion of the input image is greater than the preset proportion and the luminance of the display panel 2 is lower than the luminance threshold value, the second controller utilizes the at least one pulse signal to control the display panel 2. Furthermore, when the second controller 12 determines that the blue component proportion of the input image is not greater than the preset proportion or the luminance of the display panel 2 is not lower than the luminance threshold value, the second controller 12 utilizes the at least one direct current signal to control the display panel 2.

In the present embodiment, the second controller 12 may be electrically connected to the first controller 11 by a first signal line 13 and a second signal line 14. The second controller 12 may generate an indication signal which indicates a control mode of the first controller 11 and may be configured to control the first controller 11 to control a signal controlling the display panel 2 to emit light (referred to as emission control signal herein) according to a determination result of whether the blue component proportion of the input image is greater than the preset proportion and whether the luminance of the display panel 2 is lower than the luminance threshold value. The second controller 12 may transmit the emission control signal to the first controller 11 by the first signal line 13 and may transmit the indication signal to the first controller 11 by the second signal line 14, wherein the emission control signal is the pulse signal or the direct current signal and the control mode is a direct current control mode or a pulse width modulation (PWM) mode. That is, the indication signal may indicate the direct current control mode or the PWM mode. More specifically, at least one pulse signal may be transmitted from the second controller 12 to the first controller 11 through a first signal line 13 when the blue component proportion is greater than the preset proportion and the luminance of the display panel is lower than the luminance threshold value; at least one direct signal may be transmitted from the second controller to the first controller 11 through the first signal line 13 when the blue component proportion of the input image is not greater than the preset proportion or the luminance of the display panel is not lower than the luminance threshold value. The first controller 11 may output the emission control signal to the display panel 2 by the control mode corresponding to the indication signal according to the content of the indication signal. When the indication signal indicates the direct current control mode, the first controller 11 may control the display panel 2 by the direct current signal. When the indication signal indicates the PWM mode, the first controller 11 may control the display panel 2 by the pulse signal.

Specifically, the first controller 11 may be a backlight control integrated circuit or other types of integrated circuits controlling light emission elements which may receive two types of input control signals, and the first controller 11 may switch the form of the control signal outputted to the display panel 2 according to the indication signal from the second controller 12. Said two types of input control signals are the direct current signal and the pulse signal respectively corresponding to the direct current control mode and the PWM mode. The second controller 12 may be a scaler, a microcontroller or the other controllers having the ability of image processing.

In the present embodiment, the first controller 11 may control the light emission elements of the display panel 2. For example, the first controller 11 controls the light emission elements of the display panel 2 by electrical connection to the driving circuit of the backlight module of the display panel 2. The input image may include pixels respectively corresponding to the light emission elements. Specifically, the pixels have addresses respectively and the addresses correspond to light emission elements of the display panel 2. Each of the pixels has an address, and each of the addresses correspond to a light emission element of the display panel 2. Specially, a relationship between the aforementioned pixels, the aforementioned addresses and the aforementioned light emission elements may be one on one. The second controller 12 may generate control signals corresponding to the pixels respectively according to the input image. When the second controller 12 transmits the indication signal which indicates the first controller 11 to switch to the PWM mode by the second signal line 14, the first controller 11 switches to control the display panel 2 by the PWM method, the second controller 12 transmits pulse signals to the first controller 11 by the first signal line 13 and the first controller 11 controls the display panel 2 by pulse signals. The pulse signals may be transmitted from the second controller 12 to the first controller 11 according to the addresses and to the corresponding light emission elements respectively. When the second controller transmits the indication signal which indicates the first controller 11 to switch to the direct current mode by the second signal line 14, the first controller 11 switches to control the display panel 2 by the direct current method, the second controller 12 transmits direct current signals to the first controller 11 by the first signal line 13 and the first controller 11 controls the display panel 2 by direct current signals.

Figure 2:
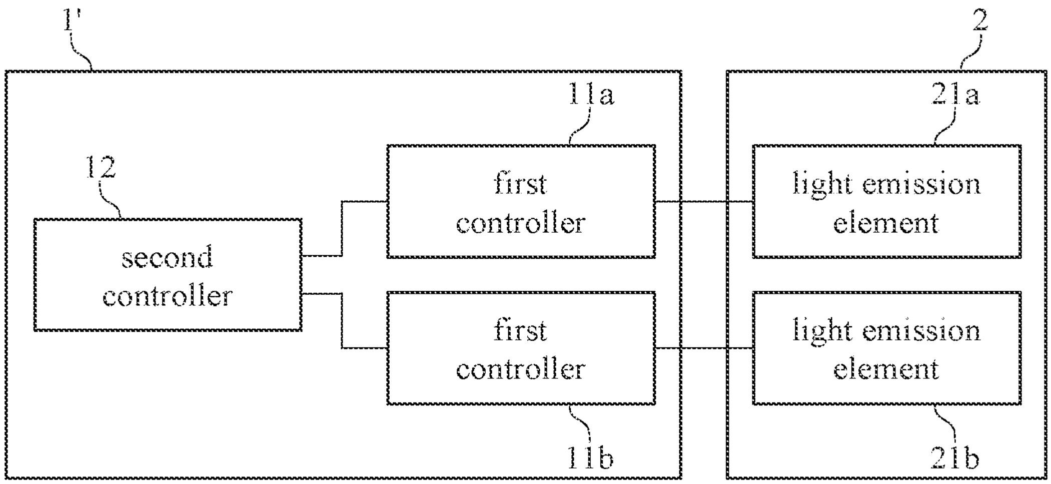
FIG. 2 illustrates a functional block diagram of a color adjustment device according to another embodiment of the present disclosure.

Please refer to FIG. 2, which illustrates a functional block diagram of a color adjustment device according to another embodiment of the present disclosure. As illustrated in FIG. 2, the color adjustment device 1' includes a number of first controllers 11*a* and 11*b* and the second controller 12, wherein each of the first controllers 11*a* and 11*b* may be implemented by the first controller 11 of the embodiment of FIG. 1 and the second controller 12 may be implemented by the second controller 12 of the embodiment of FIG. 1. The electrical connection between each of the first controllers 11*a* and 11*b* and the second controller 12 may be implemented by the content of the embodiment of FIG. 1 and would not be repeated herein. The display panel 2 includes the light emission elements 21*a* and 21*b*, wherein the light emission elements 21*a* and 21*b* are, for example, included in the backlight module of the display panel 2. The first controllers 11*a* and 11*b* may be electrically connected to the light emission elements 21*a* and 21*b* respectively to control the light emission of the light emission elements 21*a* and 21*b*. Although FIG. 2 illustrates the number of each of the first controllers and the light emission elements is two, the number of each of the first controllers and the light emission elements may be also adjusted according to the requirement of the input image. The number of each of the first controllers and the light emission elements may be more than two and is not limited thereto.

In the present embodiment, the color adjustment device 1' may perform zone control on the display panel 2. For example, the input image includes a blue pixel and a non-blue pixel, wherein the non-blue pixel is a red pixel or a green pixel for example. If the light emission element 21*a* corresponds to the blue pixel of the input image and the light emission element 21*b* corresponds to the non-blue pixel of the input image, the second controller 12 may control the first controller 11*a* to transmit the pulse signal to the light emission element 21*a* for the blue pixel and may control the first controller 11*b* to transmit the direct current signal to the light emission element 21*b* for the non-blue pixel when determining that the blue component proportion of the input image is greater than the preset proportion and the luminance of the display panel 2 is lower than the luminance threshold value.

It should be noted that, the number of each of the first controllers and the light emission elements may be more than two, the second controller 12 may control a part of the first controllers to transmit pulse signals to the light emission elements corresponding to the blue pixels and may control the other part of the first controllers to transmit direct current signals to the light emission elements corresponding to the non-blue pixels. Hence, said first controllers 11*a* and 11*b* are exemplarily demonstrated and are not used to limit the present disclosure.

In addition, the color adjustment device 1' may control the display panel 2 by the direct current control or the PWM control of for the entire area. That is, when determining that the blue component proportion of the input image is greater than the preset proportion and the luminance of the display panel 2 is lower than the luminance threshold value, the color adjustment device 1' utilizes the pulse signals to control all of the light emission elements by all of the first controllers, and when determining that the blue component proportion of the input image is not greater than the preset proportion or the luminance of the display panel 2 is not lower than the luminance threshold value, the color adjustment device 1' utilizes the direct current signals to control all of the light emission elements by all of the first controllers.

Figure 3:
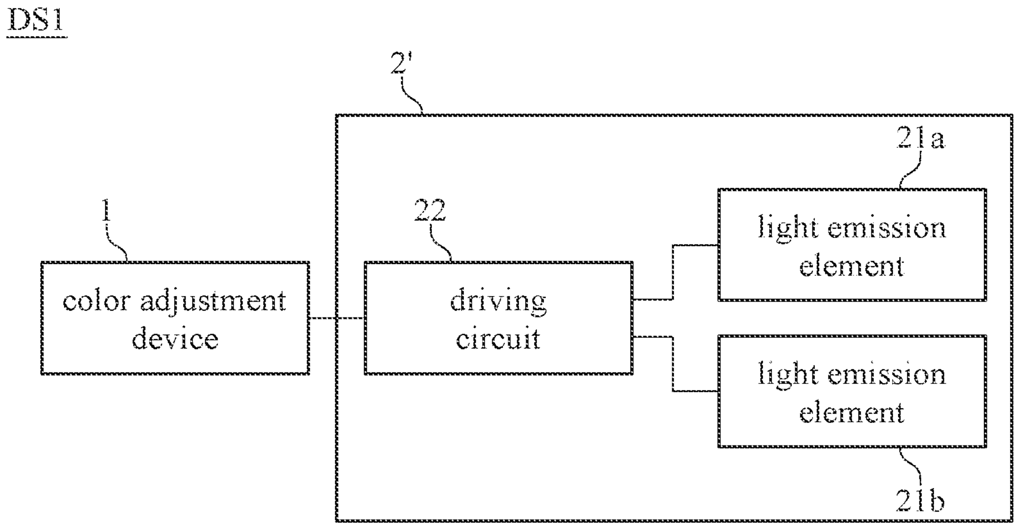
FIG. 3 illustrates a functional block diagram of a display according to one embodiment of the present disclosure.

Please refer to FIG. 3, which illustrates a functional block diagram of a display according to one embodiment of the present disclosure. As illustrated in FIG. 3, a display DS1 includes the color adjustment device 1 and a display panel 2'. The color adjustment device 1 is connected to the display panel 2', and the configuration of the color adjustment device 1 may be the same as the color adjustment device 1 of FIG. 1 or the color adjustment device 1' of FIG. 2 and its description would not be repeated herein. The display panel 2' may include the backlight module, and the backlight module includes the light emission element 21*a* and the light emission element 21*b*. The display panel 2' may also include a driving circuit 22, and the driving circuit is configured to control the light emission of the backlight module, i.e. control the light emission of the light emission element 21*a* and the light emission element 21*b*. The color adjustment device 1 is electrically connected to the driving circuit 22, and especially, the first controller of the color adjustment device 1 is electrically connected to the driving circuit 22.

Figure 4:
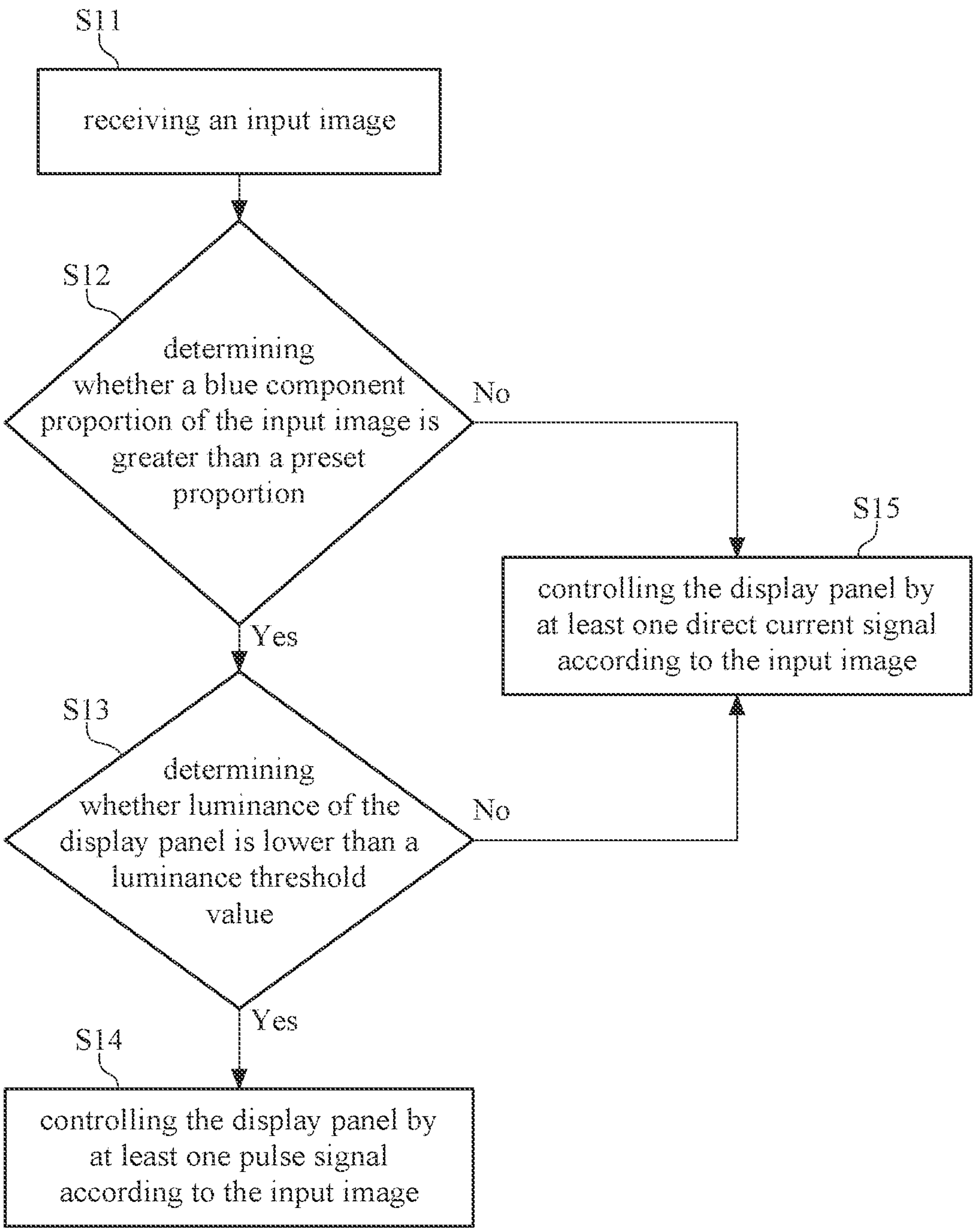
FIG. 4 illustrates a flowchart of a color adjustment method according to one embodiment of the present disclosure.

Please refer to FIG. 4, which illustrates a flowchart of a color adjustment method according to one embodiment of the present disclosure. As illustrated in FIG. 4, the color adjustment method includes step S11~step S15. The color adjustment method shown in FIG. 4 may be applicable to the color adjustment device 1 or the color adjustment device 1' shown in FIG. 1 to FIG. 3, but is not limited thereto. For example, step S11~step S15 would be exemplarily explained by the operation of the color adjustment device 1 shown in FIG. 1 as follows.

Step S11: receiving the input image. Specifically, the second controller 12 pre-stores the input image or receives the input image inputted from an external device (e.g. USB, a hard disk or a cloud server).

Step S12: determining whether the blue component proportion of the input image is greater than the preset proportion. Specifically, the second controller 12 may distinguish the blue pixel and the non-blue pixel, calculate an occupied proportion of the blue pixel in the input image as the blue component proportion, and determine whether the blue component proportion of the input image is greater than the preset proportion. If the blue component proportion of the input image is greater than the preset proportion, then step S13 is performed; If the blue component proportion of the input image is not greater than the preset proportion, the second controller 12 transmits the indication signal which indicates the first controller 11 to switch to the direct current mode to the first controller 11 by the second signal line 14, and then step S15 is performed. In one embodied aspect, the second controller 12 may determine whether the input image is an entirely blue image and this embodied aspect may be regarded as setting the preset proportion as 100%. In another embodied aspect, the second controller 12 may determine whether a proportion of the blue pixel included in the input image is greater than a proportion of the non-blue pixel included in the input image, and this embodied aspect may be regarded as setting the preset proportion as one-third. In yet another embodied aspect, the second controller 12 may determine whether the input image has a pixel of which the luminance value is greater than a specific threshold value (e.g. 250 nit) and determine that the blue component proportion of the input image is greater than the preset proportion when there is a pixel with the luminance value greater than the specific threshold value. This embodied aspect may be regarded as setting the preset proportion as 0%. The aforementioned embodied aspects are merely demonstrated for example and the preset proportion may be also adjusted according to the actual requirement.

Step S13: determining whether the luminance of the display panel is lower than the luminance threshold value. Specifically, the second controller 12 obtains the luminance of the display panel 2 and compares the luminance of the display panel 2 with the luminance threshold value.

In one embodied aspect, the second controller 12 is connected to a light sensor in the display panel 2, the light sensor senses the luminance of the display panel 2 and the second controller 12 further obtains the luminance of the display panel 2. In another embodied aspect, the second controller 12 is configured to calculate the luminance according to a current control signal used by the first controller 11 for controlling the light emission of the display panel 2; specifically, the second controller 12 controls first controller 11 to generate and transmit the current control signal to the display panel 2 such that the display panel 2 emits light, and the second controller 12 compares the voltage value of the current control signal with a voltage value corresponding to maximum luminance to calculate the luminance of the display panel 2, wherein the maximum luminance is the luminance that the display panel 2 can emit according to a upper limit current. In yet another embodied aspect, the second controller 12 stores a history control signal previously used for controlling the first controller 11 and calculates the luminance according to the history control signal; specifically, the second controller 12 may store the emission control signal as the history control signal at the time when the second controller 12 previously controlled the first controller 11 to control the display panel 2 to display another input image, and compare the voltage value of the history control signal with the voltage value corresponding to the maximum luminance to calculate the luminance of the display panel 2, wherein the maximum luminance is the luminance that the display panel 2 can emit according to the upper limit current.

The second controller 12 determines whether the luminance of the display panel 2 is lower than the luminance threshold value after obtaining the luminance of the display panel 2. When the luminance of the display panel 2 is lower than the luminance threshold value, the second controller 12 determines that the luminance of the display panel 2 is low luminance and transmits the indication signal which indicates the first controller 11 to switch to the PWM mode to the first controller 11 by the second signal line 14, and then step S14 is performed; when the luminance of the display panel 2 is not lower than the luminance threshold value, the second controller 12 determines that the luminance of the display panel 2 is high luminance and transmits the indication signal which indicates the first controller 11 to switch to the direct current control mode to the first controller 11 by the second signal line 14, and then step S15 is performed. For example, the luminance threshold value may be 120 nits, and the luminance threshold value may also be other values according to the actual display situation of the display panel 2, but the range of the luminance threshold value is not limited thereto and the aforementioned luminance threshold value is just an example.

Here, it should be specially explained that, FIG. 4 exemplarily illustrates that the determination of the blue component proportion of the input image is first performed and then the determination of the luminance of the display panel 2 is performed, but the present disclosure is not limited thereto. In other words, the order of step S12 and step S13 may be the same as the order shown in FIG. 4 or the opposite of the order shown in FIG. 4, or step S12 and step S13 may be performed at the same time.

Step S14: controlling the display panel 2 by at least one pulse signal according to the input image. Specifically, the second controller 12 controls the first controller 11 to control the display panel 2 by at least one pulse signal according to the input image.

In one embodied aspect, referring to FIG. 1 again, the first controller 11 switches to output the pulse signal according to the indication signal transmitted by the second controller 12 of which the content is to switch to the PWM mode, the second controller 12 generates one pulse signal according to each of the addresses of the input image and the zone corresponding to each of the addresses of the input image, wherein each pulse signal has a number indication to correspond to one address. Furthermore, the second controller 12 may store a corresponding relationship between the maximum luminance, the direct current value and the pulse signal value, and may calculate the pulse signal value corresponding to the luminance of each of the addresses according to the corresponding relationship. For example, the maximum luminance is 255 nit, the corresponding direct current value is 3.3V and the corresponding pulse signal value is 20V, and for the pixel address of which the luminance is 102 nit, the corresponding direct current value is 1.32V and the corresponding pulse signal value is 8V. And then, the second controller 12 adjusts the width of each pulse signal according to the proportion of the luminance and the maximum luminance of the display panel 2, and further determines the duty cycle of each pulse signal. The second controller 12 transmits the pulse signals to the first controller 11, and the first controller 11 transmits the pulse signals to the display panel 2 so that the light emission elements of the display panel 2 emit light.

Step S15: controlling the display panel 2 by at least one direct current signal according to the input image. Specifically, the second controller 12 transmits the indication signal to the first controller 11, and the first controller 11 switches to output the direct current signal according to the indication signal transmitted by the second controller 12, wherein the content of the indication signal is to switch to the direct current mode. The second controller 12 generates and transmits the direct current signals to the first controller 11 according to the content and the address of each pixel, the first controller 11 transmits the direct current signals to the display panel 2 and the light emission elements of the display panel 2 emit light according to direct current signals.

Figure 5:
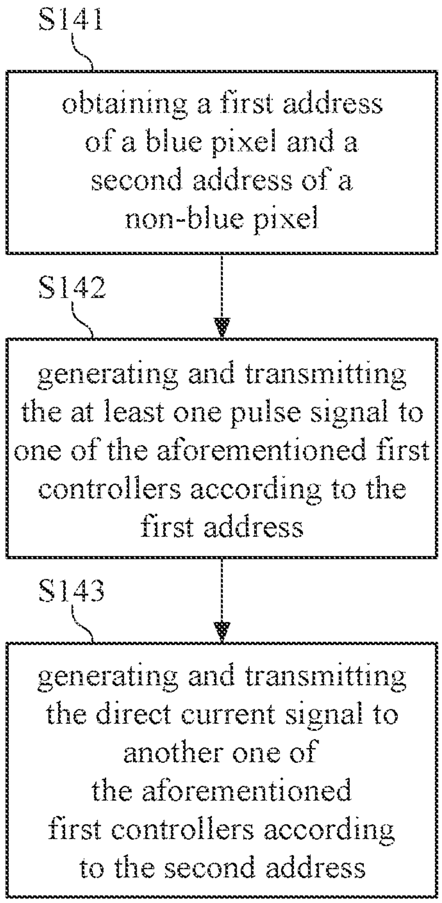
FIG. 5 illustrates a flowchart of the steps of controlling the display panel by at least one pulse signal in the color adjustment method according to another embodiment of the present disclosure.

Please refer to FIG. 5, which illustrates a flowchart of the steps of controlling the display panel by at least one pulse signal in the color adjustment method according to another embodiment of the present disclosure. In the present embodiment, the color adjustment method includes step S11~step S15, and step S11 to step S13 and step S15 are described as the embodiment of FIG. 4 and would not be repeated herein, but there is still a difference between the present embodiment and the aforementioned embodiment, which is: the step of controlling the display panel 2 by at least one pulse signal (i.e. step S14) may include step S141~step S143, and step S141~step S143 are about generating the pulse signal and the direct current signal for the blue pixel and the non-blue pixel to control the light emission of the display panel 2. For example, step S141~step S143 would be exemplarily explained by the operation of the color adjustment device 1' shown in FIG. 2 as follows.

Step S141: obtaining a first address of the blue pixel and a second address of the non-blue pixel. Specifically, the input image comprises a blue pixel with a first address and a non-blue pixel with a second address, and the second controller 12 obtains the first address according to the location of the blue pixel in the input image and obtains the second address according to the location of the non-blue pixel in the input image.

Step S142: generating and transmitting the at least one pulse signal to one of the aforementioned first controllers according to the first address. The at least one pulse signal is transmitted from the second controller 12 to the first controller 11*a* according to the first address. Specifically, the second controller 12 transmits the indication signal to the first controller 11*a*, the first controller 11*a* switches to output the pulse signal according to the indication signal of which the content is to switch to the PWM mode, the second controller 12 obtains the pulse signal value corresponding to the blue pixel according to the corresponding relationship between the luminance of the blue pixel and the direct current value and the pulse signal value as well as the corresponding relationship between the maximum luminance and the direct current value and the pulse signal value, and generates a first number indicating the first address and generates the pulse signal with the first number. And then, the second controller 12 adjusts the width of the pulse signal according to the proportion of the luminance and the maximum luminance of the display panel 2 and further determines the duty cycle of the pulse signal. The second controller 12 transmits the pulse signal to the first controller 11*a*, the first controller 11*a* transmits the pulse signal to the driving circuit 22 of the display panel 2, and the driving circuit 22 of the display panel 2 controls the light emission element 21*a* to emit light according to the pulse signal.

Step S143: generating and transmitting the direct current signal to another one of the aforementioned first controllers according to the second address. The direct current signal is transmitted from the second controller 12 to the first controller 11*b* according to the second address. Specifically, the second controller 12 transmits the indication signal to the first controller 11*b*, the first controller 11*b* switches to output the direct current signal according to the indication signal of which the content is to switch to the direct current control mode, the second controller 12 obtains the direct current signal value corresponding to the non-blue pixel according to the corresponding relationship between the luminance of the non-blue pixel and the direct current value and the pulse signal value as well as the corresponding relationship between the maximum luminance and the direct current value and the pulse signal value, and generates a second number indicating a second address and generates the direct current signal with the second number. And then, the second controller 12 transmits the direct current signal to the first controller 11*b*, the first controller 11*b* transmits the direct current signal to the driving circuit 22 of the display panel 2, and the driving circuit 22 of the display panel 2 controls the light emission element 21*b* to emit light according to the direct current signal.

The aforementioned description is for the control of two light emission elements which are one blue pixel and one non-blue pixel. The emission control of the other blue pixels and non-blue pixels in the input image are the same as the aforementioned description and would not be repeated herein.

Figure 6A:
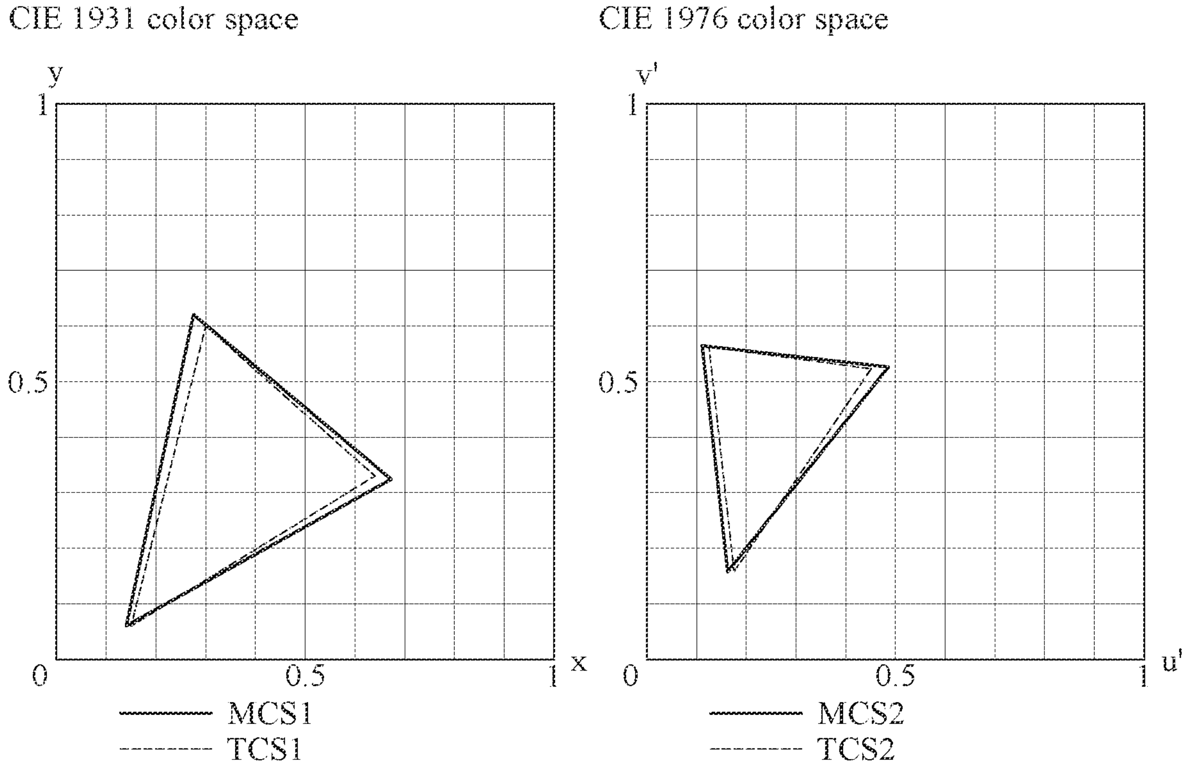
FIG. 6A is a color space diagram before the color adjustment method of one embodiment of the present disclosure is utilized for adjustment.
Figure 6B:
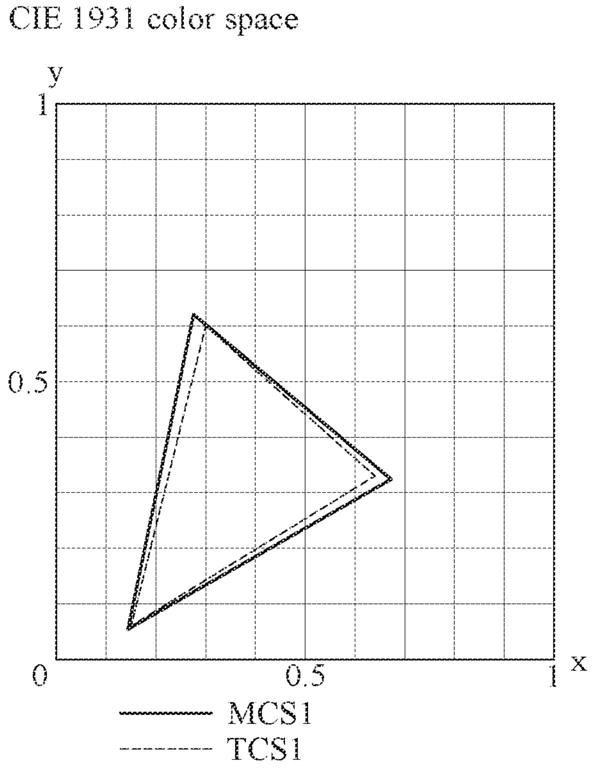
FIG. 6B is a color space diagram after the color adjustment method of one embodiment of the present disclosure is utilized for adjustment.
Figure 6B:
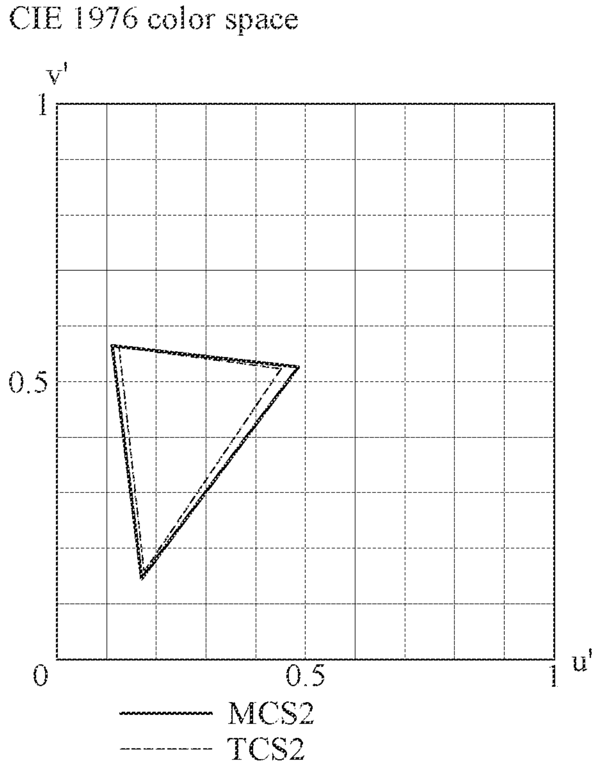

Please refer to FIG. 6A and FIG. 6B, wherein FIG. 6A is a color space diagram before the color adjustment method of one embodiment of the present disclosure is utilized for adjustment, and FIG. 6B is a color space diagram after the color adjustment method of one embodiment of the present disclosure is utilized for adjustment. As illustrated in FIG. 6A, a color meter performs a color measurement on the display panel 2 with low luminance to obtain measured color spaces MCS1 and MCS2. The measured color space MCS1 is obtained by adopting International Commission on Illumination (CIE) 1931 color space calculation method, and the measured color space MCS2 is obtained by adopting CIE 1976 color space calculation method. A target color space TCS1 is standard Red Green Blue (sRGB) color space adopting CIE 1931 color space calculation method, and a target color space TCS2 is standard Red Green Blue (sRGB) color space adopting CIE 1976 color space calculation method. There are some differences between the measured color space MCS1 and the target color space TCS1 and there are some differences between the measured color space MCS2 and the target color space TCS2. Specially, the differences on the blue color coordinates are obvious.

As illustrated in FIG. 6B, after the color adjustment method of one embodiment of the present disclosure is utilized, the differences on the blue color coordinates between the measured color space MCS1 and the target color space TCS1 corresponding to the display panel 2 with the low luminance become small, and the differences on the blue color coordinates between the measured color space MCS2 and the target color space TCS2 corresponding to the display panel 2 with the low luminance become small. In other words, by adjust the image by the pulse signal, the color of the image is closer to the color of sRGB color space.

In addition, the measured color space MCS1 after the color adjustment method of one or more embodiments of the present disclosure is utilized is converted into light-chroma-hue (LCH) color space and is inputted to delta E formula (such as CIE94 or CIEDE 2000 color variation formula), and the delta E corresponding to the measured color space MCS1 is smaller than 2. The measured color space MCS2 after the color adjustment method of one or more embodiments of the present disclosure is utilized is converted into light-chroma-hue (LCH) color space and is inputted to delta E formula (such as CIE94 or CIEDE 2000 color variation formula), and the delta E corresponding to the measured color space MCS2 is smaller than 2

In view of the above description, the color adjustment device, the display and the color adjustment method disclosed by the present disclosure may adjust image display of the display panel by the pulse signal when the blue component proportion is greater than the preset proportion and the luminance of the display panel is lower than the luminance threshold value, which may improve color precision and further lower the color variation.

What is claimed is:

1. A color adjustment device, applied to a display panel, comprising:

a first controller configured to control light emission of the display panel; and a second controller electrically connected to the first controller, configured to receive an input image, and determine whether a blue component proportion of the input image is greater than a preset proportion and whether luminance of the display panel is lower than a luminance threshold value, wherein at least one pulse signal is transmitted from the second controller to the first controller through a first signal line when the blue component proportion is greater than the preset proportion and the luminance of the display panel is lower than the luminance threshold value, wherein at least one direct current signal is transmitted from the second controller to the first controller through the first signal line when the blue component proportion of the input image is not greater than the preset proportion and the luminance of the display panel is lower than the luminance threshold value.

2. The color adjustment device according to claim 1, wherein at least one direct current signal is transmitted from the second controller to the first controller through the first signal line when the luminance of the display panel is not lower than the luminance threshold value.

3. The color adjustment device according to claim 1, wherein the second controller is electrically connected to the first controller through the first signal line and a second signal line, transmits the at least one pulse signal to the first controller through the first signal line, and transmits an indication signal to the first controller through the second signal line, and the first controller outputs the at least one pulse signal to the display panel according to the indication signal.

4. The color adjustment device according to claim 1, wherein the second controller determines a duty cycle of the at least one pulse signal according to a proportion of the luminance and maximum luminance.

5. The color adjustment device according to claim 1, wherein the input image comprises a plurality of pixels, each of the pixels has an address, each of the addresses correspond to a light emission element of the display panel, and the at least one pulse signal is transmitted from the second controller to the first controller according to the addresses and to the corresponding light emission elements respectively.

6. The color adjustment device according to claim 1, wherein there are a plurality of first controllers, and each of the first controllers controls a light emission element of the display panel, the input image comprises a blue pixel with a first address and a non-blue pixel with a second address, and the at least one pulse signal is transmitted from the second controller to one of the plurality of first controllers according to the first address, a direct current signal is transmitted from the second controller to another one of the plurality of first controllers according to the second address.

7. The color adjustment device according to claim 1, wherein the second controller is connected to the display panel to obtain the luminance.

8. The color adjustment device according to claim 1, wherein the second controller is further configured to calculate the luminance according to a current control signal used by the first controller for controlling light emission of the display panel.

9. The color adjustment device according to claim 1, wherein the second controller is further configured to store a history control signal previously used for controlling the first controller and to calculate the luminance according to the history control signal.

10. A display, comprising:
- a display panel; and
- a color adjustment device electrically connected to the display panel and comprising:
  - a first controller configured to control light emission of the display panel; and
  - a second controller electrically connected to the first controller, configured to receive an input image, and determine whether a blue component proportion of the input image is greater than a preset proportion and whether luminance of the display panel is lower than a luminance threshold value, wherein at least one pulse signal is transmitted from the second controller to the first controller through a first signal line when the blue component proportion is greater than the preset proportion and the luminance of the display panel is lower than the luminance threshold value,
  - wherein at least one direct current signal is transmitted from the second controller to the first controller through the first signal line when the blue component proportion of the input image is not greater than the preset proportion and the luminance of the display panel is lower than the luminance threshold value.

11. The display according to claim 10, wherein the display panel comprises a backlight module and a driving circuit, the driving circuit controls light emission of the backlight module, and the first controller is electrically connected to the driving circuit.

12. A color adjustment method, applied to a display panel, performed by a color adjustment device, comprising:
- determining whether a blue component proportion of an input image is greater than a preset proportion;
- determining whether luminance of the display panel is lower than a luminance threshold value;
- controlling the display panel by at least one pulse signal according to the input image when the blue component proportion of the input image is greater than the preset proportion and the luminance of the display panel is lower than the luminance threshold,
- controlling the display panel by at least one direct current signal according to the input image when the blue component proportion of the input image is not greater than the preset proportion and the luminance of the display panel is lower than the luminance threshold value.

13. The color adjustment method according to claim 12, further comprising:
- controlling the display panel by at least one direct current signal according to the input image when the luminance of the display panel is not lower than the luminance threshold value.

14. The color adjustment method according to claim 12, wherein controlling the display panel by at least one pulse signal according to the input image comprises:
- determining a duty cycle of the at least one pulse signal according to a proportion of the luminance and maximum luminance.

15. The color adjustment method according to claim 12, wherein the input image comprises a plurality of pixels, each of the pixels has an address, each of the addresses correspond to a light emission element of the display panel and controlling the display panel by the at least one pulse signal according to the input image comprises:
- respectively generating and transmitting the at least one pulse signal to the corresponding light emission elements according to the addresses.

16. The color adjustment method according to claim 12, wherein the color adjustment device comprises a plurality of first controllers and a second controller, each of the first controllers controls a light emission element of the display panel, the input image comprises a blue pixel and a non-blue pixel, and controlling the display panel by the at least one pulse signal according to the input image comprises:
- obtaining a first address of the blue pixel and a second address of the non-blue pixel;
- generating and transmitting the at least one pulse signal to one of the plurality of first controllers according to the first address; and
  - generating and transmitting a direct current signal to another one of the plurality of first controllers according to the second address.

17. The color adjustment method according to claim 12, wherein determining whether the luminance of the display panel is lower than the luminance threshold value comprises:
- obtaining the luminance from the display panel.

18. The color adjustment method according to claim 12, wherein the color adjustment device comprises a first controller and a second controller, and controlling the display panel by the at least one pulse signal according to the input image comprises:
- controlling the first controller by the at least one pulse signal transmitted from the second controller according to the input image;
- wherein determining whether the luminance of the display panel is lower than the luminance threshold value comprises:
  - calculating the luminance by the second controller according to a current control signal used by the first controller for controlling light emission of the display panel.

19. The color adjustment method according to claim 12, wherein the color adjustment device comprises a first controller and a second controller, and controlling the display panel by the at least one pulse signal according to the input image comprises:
- controlling the first controller by the at least one pulse signal transmitted from the second controller according to the input image;
- wherein determining whether the luminance of the display panel is lower than a luminance threshold value comprises:
  - calculating the luminance by the second controller according to a history control signal previously used for controlling the first controller.

* * * * *